United States Patent
Hilli et al.

(10) Patent No.: US 10,035,957 B2
(45) Date of Patent: Jul. 31, 2018

(54) METHOD FOR TREATING LIGNIN-BASED MATERIAL

(71) Applicant: Valmet Technologies Oy, Espoo (FI)

(72) Inventors: Tuomo Hilli, Tampere (FI); Pekka Tynjaelae, Joensuu (FI); Henrik Romar, Pietarsaari (FI)

(73) Assignee: Valmet Technologies Oy, Espoo (FI)

( * ) Notice: Subject to any disclaimer, the term of this patent is extended or adjusted under 35 U.S.C. 154(b) by 225 days.

(21) Appl. No.: 15/016,993

(22) Filed: Feb. 5, 2016

(65) Prior Publication Data
US 2016/0230099 A1    Aug. 11, 2016

(30) Foreign Application Priority Data

Feb. 6, 2015  (FI) .................................... 20155081

(51) Int. Cl.
| | |
|---|---|
| C07G 1/00 | (2011.01) |
| C10B 53/02 | (2006.01) |
| C08H 7/00 | (2011.01) |
| C10L 9/08 | (2006.01) |
| C08K 3/04 | (2006.01) |
| C10L 5/44 | (2006.01) |
| C01B 32/336 | (2017.01) |

(52) U.S. Cl.
CPC ............ *C10B 53/02* (2013.01); *C01B 32/336* (2017.08); *C07G 1/00* (2013.01); *C08H 6/00* (2013.01); *C08K 3/04* (2013.01); *C10L 5/442* (2013.01); *C10L 5/445* (2013.01); *C10L 9/086* (2013.01); *Y02E 50/10* (2013.01); *Y02E 50/30* (2013.01)

(58) Field of Classification Search
CPC ......... C08K 3/04; C10B 53/02; C01B 32/336; C07G 1/00; C08H 6/00
See application file for complete search history.

(56) References Cited

U.S. PATENT DOCUMENTS

| | | |
|---|---|---|
| 2008/0006518 A1 | 1/2008 | Shimojo et al. |
| 2008/0032344 A1 | 2/2008 | Fallavollita |
| 2008/0317661 A1 | 12/2008 | Eckert et al. |
| 2010/0325947 A1 | 12/2010 | Ohman et al. |
| 2012/0103040 A1 | 5/2012 | Wolf et al. |
| 2014/0027677 A1* | 1/2014 | Lipka .................... H01B 1/24 252/502 |
| 2014/0271443 A1 | 9/2014 | Baker et al. |
| 2015/0321173 A1* | 11/2015 | Gronberg ................ C09C 1/48 502/182 |
| 2016/0038913 A1 | 2/2016 | Vyskocil et al. |

FOREIGN PATENT DOCUMENTS

| | | |
|---|---|---|
| EP | 1797236 B1 | 6/2011 |
| EP | 1794363 B1 | 2/2012 |
| EP | 2796561 A1 | 10/2014 |
| EP | 2982649 A1 | 2/2016 |
| JP | 2011-178851 A | 9/2011 |
| WO | WO 2006/038863 A1 | 4/2006 |
| WO | WO 2009/104995 A1 | 8/2009 |
| WO | WO 2012/119875 A1 | 9/2012 |
| WO | WO 2013/002687 A1 | 1/2013 |
| WO | WO 2013/112100 A1 | 8/2013 |
| WO | WO 2014/096544 A1 | 6/2014 |

OTHER PUBLICATIONS

Kang, Shimin, et al., "Characterization of Hydrochars Produced by Hydrothermal Carbonization of Lignin, Cellulose, D-Xylose, and Wood Meal", *Industrial & Engineering Chemistry Research*, Jul. 4, 2012, pp. 9023-9031, vol. 51, No. 26, ACS Publications, U.S.A.
Kang, Shimin, et al., "Solid Fuel Production by Hydrothermal Carbonization of Black Liquor", *Bioresource Technology*, Apr. 2012, pp. 715-718, vol. 110, Elsevier Ltd., U.K.
Marton, Joseph, "On the Structure of Kraft Lignin", *TAPPI*, Nov. 1964, pp. 713-719, vol. 47, No. 11, Technical Association of the Pulp and Paper Industry, U.S.A.
Finnish Patent and Registration Office, Search Report for Application No. 20155081, dated Sep. 30, 2015, 2 pages, Finland.
Libra, J. A. et al., "Hydrothermal carbonization of biomass residuals: a comparative review of the chemistry, processes and applications of wet and dry pyrolysis", *Biofuels*, 2011, pp. 89-124, vol. 2, Future Science Ltd, U.K.
Valmet Corporation, "LignoBoost™: Lignin from Kraft Black Liquor (Brochure)", Mar. 2014, Finland.
European Patent Office, Extended European Search Report for Application No. 16397502.2, dated Jun. 22, 2016, 8 pages, Germany.

\* cited by examiner

*Primary Examiner* — Peter D Mulcahy
(74) *Attorney, Agent, or Firm* — Alston & Bird LLP

(57) ABSTRACT

A method of treating lignin-based material is provided, comprising the steps of subjecting lignin separated from lingo-cellulosic raw material to hydrothermal carbonization process at an elevated temperature, where carbonized lignin having increased carbon content is obtained, and stabilizing the obtained carbonized lignin under inert atmosphere at a stabilization temperature higher than the temperature of the hydrothermal carbonization process.

17 Claims, 1 Drawing Sheet

METHOD FOR TREATING LIGNIN-BASED MATERIAL

CROSS-REFERENCE TO RELATED APPLICATIONS

Figure 1:
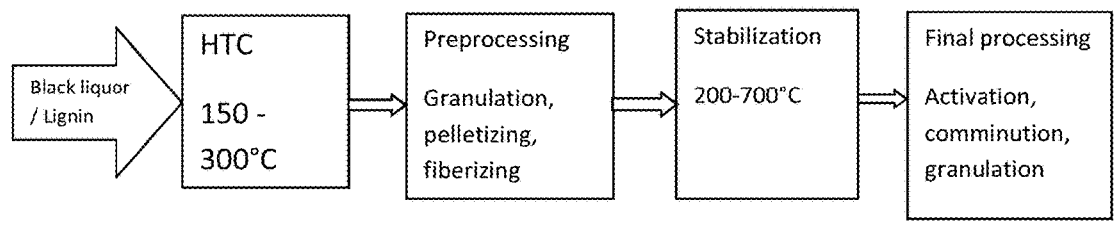

This application claims priority to and the benefit of Finnish Application No. 20155081, filed Feb. 6, 2015; the contents of which as are hereby incorporated by reference in their entirety.

BACKGROUND

Technical Field

The present invention relates to a method for treating lignin-based material. The material which is to be treated is carbonized material which is obtained in the hydrothermal carbonization (HTC) of lignin.

It is previously known to extract lignin, a component of wood, from pulp mill black liquor. Lignin so separated can be used as a fuel. The known process for separating lignin from pulp mill black liquor, described in a simplified manner, comprises precipitation of lignin by lowering the pH of the black liquor, and dewatering of the precipitated lignin. These methods are known for example from European patent EP 1797236 B1 EP1794363 B1 and US Patent Application US 2010/0325947 A1, which also discloses re-suspending the dewatered lignin to water where the pH is lowered by using acid and dewatering again the suspension.

The above described process for separating lignin is sold under the trademark LignoBoost™. The LignoBoost™ process produces a lignin product which can be used as a fuel. This is the same use of lignin as before, because lignin is normally burnt in the recovery boiler when the black liquor containing it is fed to the boiler.

It is known that lignin fibres made by melt extrusion from lignin separated from the black liquor (for example by LignoBoost™) can be stabilized at the temperature of 200-250° C., as is described by international application WO2013112100.

BRIEF SUMMARY

It is the purpose of the invention to provide a more refined product derived from lignin. This product can be used for other purposes than just burning for its fuel value.

According to the invention, the lignin contained in a liquid medium or separated from it is treated in hydrothermal carbonization (HTC) process to make carbonized lignin, and after the hydrothermal carbonization process, the obtained carbonized lignin is stabilized at a higher temperature than that of the HTC process. The stabilization treatment is thermal stabilization, the purpose of which is to prepare the material for the finishing processing steps of the carbon product.

The material which is to stabilized, the carbonized lignin, is a solid substance which has its origin in lignin but differs from the lignin in that its carbon content is higher due to the HTC process, when compared with the starting material (lignin) supplied to the HTC process. The material that is the product of the HTC process can also be called "lignin-based HTC-carbon".

The stabilization treatment is preceded possibly by a mechanical preprocessing of the carbonized lignin. The preprocessing can be carried out by granulation, pelletizing or making fibres out of the material. If fibres are to be produced, a polymeric auxiliary substance is preferably added to bind particles of carbonized lignin to fibre form before the stabilization. Due to its origin, the carbonized lignin may still contain meltable components, which can be utilized during the preprocessing for forming the material into desired shape, especially fibres. These meltable components can act alone or assisted by polymeric auxiliary substances.

The stabilization treatment carried out under a controlled time-temperature program ensures the stability of the carbonized product and it can be handled more easily, for example processed mechanically. The treatment is carried out in a suitable atmosphere, preferably inert atmosphere, but the atmosphere can also comprise non-inert gases, for example carbon dioxide. The weight loss during the stabilization is due to the removal of hydrogen and oxygen. The stabilization improves the carbon yield in the possible subsequent activation step, because the carbon compounds are transformed to a more stable form by polymerization and some functional groups are removed.

The end product (the final carbon product) may be the stabilized product which can be used in constructional applications, such as used in a composition as an additive. It can be used for example as an additive in articles made of rubber or elastomer (tires, belts etc.) in purpose of reinforcement, wear resistance and/or heat transfer.

Alternatively, the stabilized material can be processed in a further heat-treatment to the end product. This heat treatment can be further carbonization to raise the carbon content, or activation to increase the specific surface area.

The temperature-time program during the stabilization of the carbonized lignin (lignin-based HTC carbon) involves the raising of the temperature from the starting temperature to the end temperature. The material is held in the end temperature for a sufficient time, for example 10 min-10 h, usually 1-3 h. The increase rate of the temperature (° C./min) is controlled during the stabilization. Too rapid heating will make the material lumpy and sticky with leathery impervious structure, which is difficult to handle and makes the further processing (mechanical treatment, activation) difficult or even impossible. A moderate raising rate is used to prevent the above-mentioned phenomena. The rate of increase of the temperature is 0.1-20° C./min, preferably 1-20° C./min.

In a preferred embodiment, the carbonized lignin is stabilized at the temperature of 200-700° C., preferably 300-600° C. The stabilization end temperature where the material is held after the temperature increase is in the above-mentioned ranges, and suitable holding times in the end temperature are mentioned above.

The treatment method increases the value of the lignin and the end product obtained after the hydrothermal carbonization of lignin, subsequent stabilization of the lignin-based HTC-carbon product by temperature treatment, and final processing of the stabilized material. The end product can be used as constructional or functional material instead of using lignin only as fuel.

As a whole, carbon can be recovered from lignin-containing liquid mediums by the method with a high carbon-efficiency (carbon yield).

The method is not dependent on the method by which lignin is separated from the original natural biomass, which is lignocellulosic raw material, commonly wood. Most conveniently lignin becomes separated from the biomass in a biomass conversion process where the aim is to use the biomass industrially. In this type of process the lignin ends up in a spent liquor in course of a fractionation method of the biomass. The fractionation method is especially a process where lignin is separated from cellulose in a process which can be called delignification (where lignin is removed from the lignocellulosic raw material), and it can be sulphite, soda, or kraft (sulphate) delignification process. Thus, the spent liquor can be for example black liquor from kraft cooking of wood.

It is to be noted that the composition of the lignin in the spent liquor and the form of lignin therein is dependent on the preceding process and its conditions where lignin has entered this spent liquor, and chemically it may not correspond exactly to the native lignin found in the original lignocellulosic raw material, wood. The term "lignin" is used by convention both for the native lignin and for the form where lignin exists after it has been extracted from the lignocellulosic raw material.

The lignin separated from the lignocellulosic raw material is next treated in a hydrothermal carbonization process to make carbonized material which is then stabilized by temperature as was mentioned above.

BRIEF DESCRIPTION OF THE SEVERAL VIEWS OF THE DRAWING(S)

Figure 2:
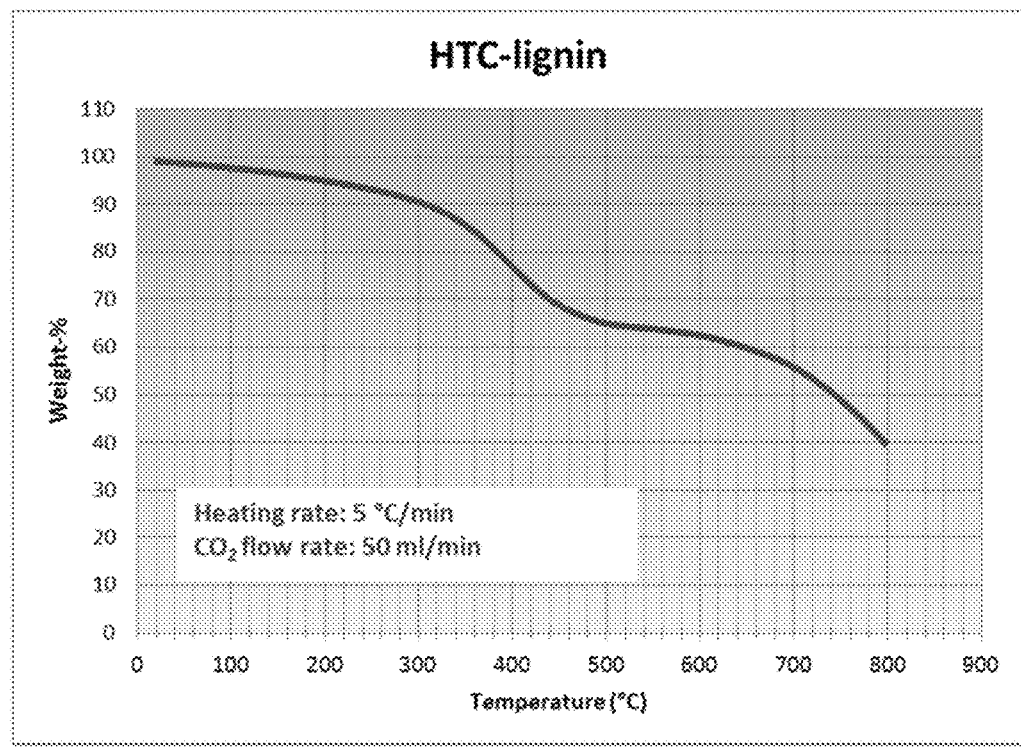

The invention will be described in more detail with reference to the appended drawings, in which FIG. 1 shows a process flow chart according to an embodiment of the invention, and FIG. 2 shows the mass reduction of the material during the stabilization treatment of the material.

DETAILED DESCRIPTION OF VARIOUS EMBODIMENTS

The invention is described in the following in more detail with reference to some embodiments, which shall not be regarded as limiting the invention.

FIG. 1 shows the process flowchart according to an embodiment of the invention. The source of the lignin is kraft black liquor (arrow on the left), which is the spent liquor left after cooking of wood in sulphate process, also called kraft process. The lignin can be separated from this black liquor by precipitating the lignin to such a particle size that it can be separated from the black liquor by physical methods, for example filtration. The precipitation is caused usually by lowering the pH of the strongly alkaline spent liquor, usually to the pH range of 9.5-11.5, which is favourable for the precipitation of lignin. Alternatively, the black liquor can be used as such in the next step.

The spent liquor may be the product from other biomass conversion processes than sulphate process, provided that it contains lignin which can be utilized. Thus, the invention is not bound to one source of lignin or method of separating it.

In the following step, the lignin is subjected to hydrothermal carbonization (HTC). The hydrothermal carbonization is based on the carbonization of organic matter at an elevated temperature and at a high pressure in an aqueous phase. Hydrothermal carbonization treatment is a method which is known for making carbonized material from a variety of biomasses, and it is described for example in patent application US-20120103040. Because the HTC process is carried out in the presence of large amount of water and it works in a wide variety of liquid/solid ratios of the lignin suspension, the lignin separated from the spent liquor need not be dried. The lignin separated from the spent liquor can be re-suspended to another liquid medium, preferably water, and the pH can be adjusted to value suitable for the process, preferably above 8. The lignin is supplied in this suspension to the HTC process. It is also possible to supply the lignin-rich spent liquor as such to the HTC process without any prior precipitation and separation of the lignin, in which case the other constituents of the spent liquor also will enter the HTC process.

The HTC process is carried out at the temperature of 150-300° C., preferably about 150 to 250° C. The process is carried out at elevated pressure. The pressure is preferably from about 20 to 40 bar during the HTC process. The duration of the hydrothermal carbonization in the given conditions is 1 to 10 hours, preferably 2 to 4 hours. The carbon content of the material increases compared with the original lignin raw material. The method is characterized by high carbon efficiency, and the lignin issues from the HTC process in the form of aqueous slurry of carbonized lignin, which can be described as "lignin-based HTC-carbon".

The solid product of the HTC process, the carbonized lignin, is separated from the slurry formed in the HTC reaction. The separation can be carried out by any means for dewatering, such as a filter press apparatus.

Next, the carbonized lignin can be subjected to preprocessing. This can be accomplished by granulating, pelletizing or fiberizing (forming fibres from the lignin-based HTC carbon). The aim of this physical preprocessing step, which is optional, is to change the material to a form where it can be more easily handled and/or the treatment in the next step will be more effective. Fiberizing involves the use of a polymeric additive and/or meltable components originating from the lignin to keep the HTC carbon in fibre form. The additives can be cellulose or oil-based polymers.

The lignin-based HTC carbon is next stabilized in a heat treatment. The heat treatment takes place according to a controlled temperature-time program, where the temperature is raised at a predetermined rate to an end temperature of the stabilization. The material is kept at the end temperature for a certain time. By moderate increase rate of the temperature and the treatment at the end temperature for a sufficient time, stabilized lignin-based HTC carbon is obtained, which can be processed further to refined carbon products.

The stabilization is carried out under a suitable atmosphere and at a temperature which is at least +30° C. over the temperature used in the preceding hydrothermal carbonization process. The stabilization converts the lignin-based HTC carbon to a more permanent stabilized form, which is easier to handle and which is more susceptible to activation, if the carbon product is to be activated. The atmosphere consists of an inert gas or a mixture of inert gases. The inert gas is nitrogen or a noble gas.

Thus, nitrogen or noble gas is preferably used as the atmosphere in stabilization. However, other factors, especially the availability of gases at low cost can influence the choice and even non-inert gases could be used. If for example carbon dioxide is available at the production plant, it can be used in the stabilization. Likewise, flue gas containing carbon dioxide, nitrogen and water vapor can be used. Non-inert gases used as stabilization atmosphere can be product from another process close to the production plant of the carbon product, for example a process in an industrial plant or factory to which the production plant is integrated. Since the stabilization treatment temperature is relatively low (below 700° C., preferably below 600° C.), the possible carbon losses remain still on a low level even with non-inert gases.

The carbon dioxide or the flue gas may advantageously be used as stabilization atmosphere if the final carbon product produced from the stabilized HTC carbon is activated carbon. In this case the same gas or gas mixture can be used in the stabilization of the HTC carbon and in the subsequent activation of the stabilized HTC carbon to activated carbon.

The stabilization temperature is 200-700, preferably 300-600° C. The optimum stabilization temperature is believed to be 500-600° C. The rate of increase of the temperature to the stabilization temperature is 0.1-20° C./min, preferably 1-20° C./min. The gas or gas mixture that forms the atmosphere is preferably caused to flow under these conditions so that gases exiting the material during the stabilization treatment (mainly oxygen and hydrogen) are flushed away.

EXAMPLES

The following examples are presented to further illustrate the invention, but the invention shall not be considered as limited thereto. Many modifications and variations will be apparent to those skilled in the art upon consideration of the present disclosure.

Example 1

Stabilization treatment was applied to carbonized lignin made by the HTC process (lignin-based HTC carbon) using a controlled time-temperature-regime.

FIG. 2 shows the mass of the lignin-based HTC carbon as a function of the temperature in course of the stabilization treatment. The rate of temperature increase was constant, 5° C./min, from 20° C. to 800° C., and the feed rate of carbon dioxide gas to the treatment chamber where the material was placed was 50 ml/min. The figure shows that the mass decrease rate is at its lowest in the temperature interval of 500-600° C. After this interval, the mass reduction is a sign of the starting activation (under carbon dioxide atmosphere). Inert gas such as nitrogen used instead of carbon dioxide will bring about similar temperature-dependent behaviour in the temperature range designed for the stabilization.

As the elements exiting the material are mainly other than carbon, the carbon content rises during the treatment from about 70% to about 90-95%. The stabilization treatment also increases the carbon yield in subsequent finishing processing steps of the carbon product compared with non-stabilized carbon product. The carbon yield is defined as the ratio of amount of elementary carbon in the carbon product to the amount of elementary carbon present in the starting material (lignin-based HTC product).

Example 2

The effect of stabilization was studied by applying different treatments to raw material which was lignin-based HTC carbon. The results are shown in the following table.

TABLE 1

Activation test made to lignin-based HTC carbon (raw material). TC = total carbon, IC = inorganic carbon and TOC = organic carbon. Yield is calculated on the basis of the total mass, including ash.

| Activation test | Yield | TC % | IC % | TOC % |
|---|---|---|---|---|
| Sample Raw |  | 48.12 | 0 | 48.12 |
| Sample 280 | 88% | 53.19 | 0 | 53.19 |

TABLE 1-continued

Activation test made to lignin-based HTC carbon (raw material). TC = total carbon, IC = inorganic carbon and TOC = organic carbon. Yield is calculated on the basis of the total mass, including ash.

| Activation test | Yield | TC % | IC % | TOC % |
|---|---|---|---|---|
| Sample 800 | 10% | 68.14 | 0 | 68.14 |
| Sample 280-800 | 31% | 74.66 | 0 | 74.66 |

Sample Raw Raw Material
Sample 280 Stabilized 280° C.
Sample 800 Direct CO2 activation 800° C.
Sample 280-800 Stabilized 280° C. and $CO_2$ activated 800° C.

As can be seen, with "Sample 280-800" the activation with CO2 at 800° C. after the stabilization at 280° C. decreases the yield (based on the total mass) from 88 wt-% to 31 wt-%, but not at all so much, if the activation is performed directly with CO2 at 800° C., without the stabilization, as was done with "Sample 800" (decrease from 88% to 10%).

From the results it can also be deduced that the differences in carbon yields between "Sample 280-800" and "Sample 800" are even more prominent than on the basis of the remaining mass of the product only.

Finishing and Uses of the Product

The finishing processing steps to make the carbon product may include activation. The activation is carried out at a temperature which is higher than the stabilization temperature, above 700° C., and under non-inert gases (CO2 or H2O or flue gases), to increase the surface of the carbon product, having activated carbon as end product. The final processing may also be carbonization to maximal carbon content which takes place above 800° C. under inert atmosphere, such as nitrogen. The process can be continued after the end temperature of the stabilization directly as activation or carbonization of the stabilized HTC carbon by raising the temperature from the end temperature using time-temperature program designed for the activation or stabilization and by changing the treatment atmosphere if needed.

The end products of these thermal processing steps are technical-grade carbon products (activated carbon, carbon black, carbon fibres etc.), which can be used in functional and constructional applications.

The final processing may also include mechanical processing, such as comminuting, granulation etc., which can be carried out to stabilized carbonized lignin (stabilized HTC carbon) or to stabilized carbonized lignin that has been further carbonized to maximize carbon content. The purpose of this treatment is to transform the stabilized HTC carbon to a physical form which is more suitable for the final application. The mechanical processing may be omitted if the stabilized HTC carbon is already in suitable form, for example due to the preprocessing carried out to the HTC carbon before the stabilization. For example if the HTC carbon is made to fibres in the preprocessing step before the stabilization, the HTC carbon will also exist in fibre form after the stabilization. The stabilized HTC carbon in fibre form can then be subjected to thermal treatment in the finishing processing step, which can be carbonization to maximal carbon content, with carbon fibres as the product, or it can be activation, with activated carbon fibre as the product. If the HTC carbon is pelletized before the stabilization, it can be left in pellets also after the stabilization and subjected to the similar thermal treatment in the finishing processing steps as the fibres mentioned above.

The activated carbon obtained after the activation of the stabilized HTC carbon can also be processed mechanically to finish it for the end application.

A carbon product obtained by the method can be used generally for replacing carbon obtained from fossil sources. In constructional applications, the final carbon product can be used for example for the production of rubber or elastomer articles, for example tires or belts. The final carbon product obtained by the method according to the invention can also be used as raw material in steel production, and for producing electrode carbon. In functional applications, the carbon product can be used as activated carbon for adsorbing various substances. The final carbon product, especially activated carbon, can be used also as catalyst carrier.

As was already stated above, the stabilized HTC carbon, after possible mechanical processing, can be used as the final product without continuing the treatment in form of thermal processing to activated carbon or carbonized carbon. The stabilized HTC carbon can be used in constructional applications, for example as additive in various compositions.

Many variations of the present invention will suggest themselves to those skilled in the art in light of the above detailed description. Such obvious variations are within the full intended scope of the appended claims.

What is claimed:

1. A method for treating lignin extracted from lignocellulosic raw material, said method comprising the steps of:
    subjecting the lignin extracted from the lignocellulosic raw material to hydrothermal carbonization process at an elevated temperature, where carbonized lignin having increased carbon content is obtained, and
    stabilizing the obtained carbonized lignin in a stabilization process under an inert atmosphere at a stabilization temperature higher than the temperature of the hydrothermal carbonization process,
    wherein the stabilization process comprises:
        raising a temperature from a start temperature to the stabilization temperature, the stabilization temperature being between 300° C. and 600° C.,
        holding the obtained carbonized lignin at the stabilization temperature for between 10 minutes and 10 hours, and
        converting the obtained carbonized lignin to a permanent stabilized form due to the holding duration at the stabilization temperature.

2. The method according to claim 1, further comprising: subjecting the carbonized lignin to heat treatment according to a time-temperature program, and
    during the heat treatment, raising the temperature at a rate of 0.1-20° C./min to the stabilization temperature.

3. The method according to claim 1, further comprising: subjecting the carbonized lignin to heat treatment according to a time-temperature program, and
    during the heat treatment, raising the temperature at a rate of 1-20° C./min to the stabilization temperature.

4. The method according to claim 1, wherein the carbonized lignin is subjected to mechanical pre-processing before the stabilization.

5. The method according to claim 1, wherein after the stabilization, the stabilized carbonized lignin is made to final carbon product in finishing processing steps.

6. The method according to claim 5, wherein the finishing processing steps of the stabilized carbonized lignin include at least one of carbonization to maximal carbon content, or activation.

7. The method according to claim 5, wherein the finishing processing steps of the stabilized carbonized lignin include mechanical processing.

8. The method according to claim 5, further comprising using the final carbon product in a functional or constructional application.

9. The method according to claim 6, further comprising using the final carbon product in a functional or constructional application.

10. The method according to claim 7, further comprising using the final carbon product in a functional or constructional application.

11. The method according to claim 8, wherein the final carbon product is used in the production of rubber or elastomer articles, in the production of steel or electrode carbon, or as activated carbon.

12. The method according to claim 9, wherein the final carbon product is used in the production of rubber or elastomer articles, in the production of steel or electrode carbon, or as activated carbon.

13. The method according to claim 10, wherein the final carbon product is used in the production of rubber or elastomer articles, in the production of steel or electrode carbon, or as activated carbon.

14. The method according to claim 11, wherein final carbon product is used in the production of rubber or elastomeric articles, which are tires or belts.

15. The method according to claim 12, wherein the final carbon product is used in the production of rubber or elastomeric articles, which are tires or belts.

16. The method according to claim 13, wherein the final carbon product is used in the production of rubber or elastomeric articles, which are tires or belts.

17. The method according to claim 1, wherein after the stabilization process, the stabilized carbonized lignin is used in constructional applications.

* * * * *